United States Patent [19]
Cetrulo, Jr.

[11] 3,722,963
[45] Mar. 27, 1973

[54] DRIVING LUG STRUCTURE FOR ENDLESS TRACK

[75] Inventor: Frank A. Cetrulo, Jr., Fort Thomas, Ky.

[73] Assignee: National Factors, Inc., Cincinnati, Ohio

[22] Filed: Sept. 10, 1971

[21] Appl. No.: 179,313

[52] U.S. Cl. ................................................. 305/38
[51] Int. Cl. ............................................ B62d 55/24
[58] Field of Search .......................... 305/35 EB, 38

[56] References Cited

UNITED STATES PATENTS

| | | |
|---|---|---|
| 3,285,677 | 11/1966 | Marier .................................. 305/38 |
| 3,451,729 | 6/1969 | Roy ...................................... 305/38 |
| 3,508,796 | 4/1970 | Paulson ............................... 305/38 |
| 3,612,625 | 10/1971 | Huber ................................. 305/38 |

*Primary Examiner*—Richard J. Johnson
*Attorney*—Leo Gregory

[57] ABSTRACT

A driving lug for an endless track member for a snowmobile, said lug comprising a seamless metal ring-like member having a core of rubber fabric material bonded thereto with said core having a transverse rod of said track member disposed therethrough and bonded thereto for a unitary construction.

2 Claims, 3 Drawing Figures

Patented March 27, 1973 3,722,963

INVENTOR.
FRANK A. CETRULO JR.
BY
Reifand Gregory
ATTORNEYS

DRIVING LUG STRUCTURE FOR ENDLESS TRACK

BACKGROUND AND SUMMARY OF INVENTION

One of the problems in connection with a driving belt or endless track member for a snowmobile is in connection with the driving lug members thereof. Said lug members are engaged by the sprockets driving the belt. It is a common practice to crimp a metal ring about a rubber fabric core to form the driving lug. The lug members are subjected to a considerably amount of shock and hard wear upon engagement by sprocket teeth and become deformed and separated at their adjoining ends. Replacement of said lug members is a frequent occurrence.

It is an object of this invention in connection with an endless track member for a snowmobile to provide a tubular or ring like seamless driving lug member which is bonded to a core of rubber fabric and which has a portion of the transverse reinforcing rod of the track member disposed therethrough in bonded relationship to said core. Thus, there is formed here a driving lug member carried by a transverse rod member having a shock absorbing core of rubber fabric which core is bonded both to said lug member and to said transverse rod whereby in effect a unitary integral driving lug structure is formed. The lug member has no seams to become broken or separated and much of the shock to which it is subjected is absorbed by its rubber core which provides sufficient resilience to the lug member as a whole to prevent the same from becoming deformed. Thus, the lug members throughout the track member in being preserved in their original form provide regular spacing therebetween for engagement by the driving sprocket.

Generally stated, it is an object of this invention to provide an endless track member for a snowmobile comprising driving lug members formed of seamless tubular members whereby said lug members are positioned in the mold in which the end less track member is formed, locating pins position said lug members about portions of the transverse rods of said track member, rubber fabric material in a liquid state is disposed within said lug members and about the transverse rod portions therein. Said rubber fabric material is cured within said lug member to become bonded to both said lug member and said rod portions therein to form an integral unitary driving lug structure.

It is more specifically an object of the invention herein to provide a driving lug member for the track member of a snowmobile wherein said lug member has a resilient core bonded thereto and to a transverse rod member of said track member to absorb the shock to which said lug member is subjected by driving sprockets and to prevent the deforming of said lug members.

These and other objects and advantages of the invention will be set forth in the following description made in connection with the accompanying drawings in which like reference characters refer to similar parts throughout the several views and in which.

DESCRIPTION OF A PREFERRED EMBODIMENT

Figure 1:
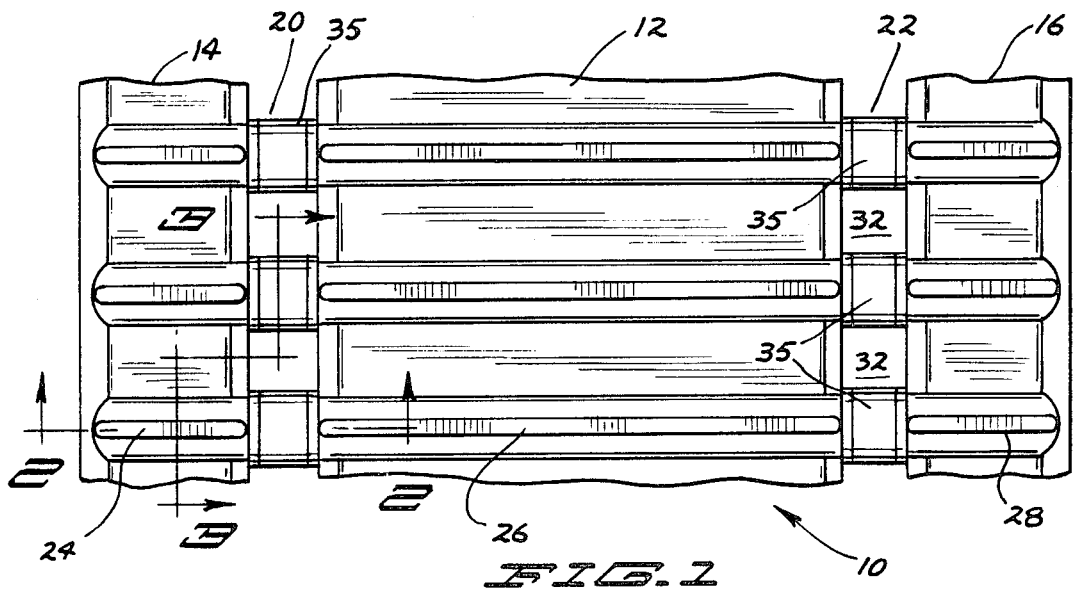
FIG. 1 is a fragmentary view in plan of an endless track member of a snowmobile.
Figure 2:
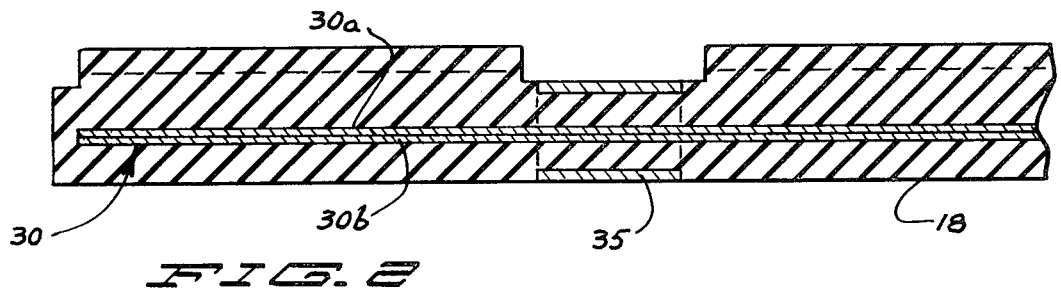
FIG. 2 is a view in transverse vertical section on an enlarged scale taken on line 2—2 of FIG. 1 as indicated.
Figure 3:
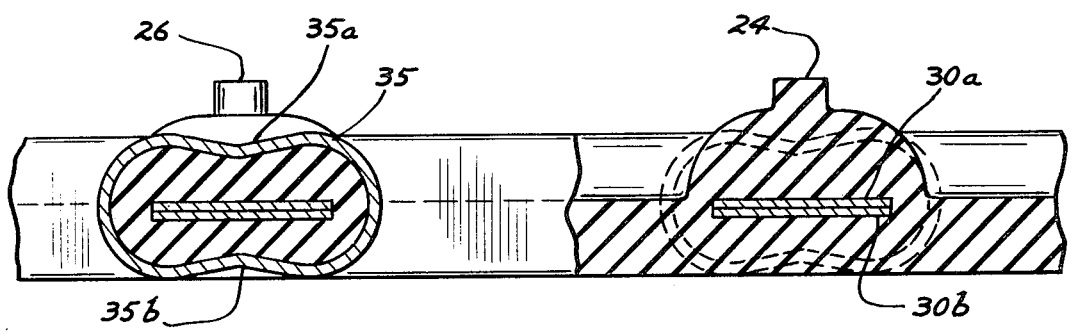
FIG. 3 is a view in vertical longitudinal section on an enlarged scale taken on line 3—3 of FIG. 1 as indicated.

Referring to the drawings, a fragmentary view is shown of an endless drive belt or track member 10 as for a snowmobile.

Said track member as here illustrated comprises a central body portion 12 and outer side body portions 14 and 16 of narrower width spaced therefrom at either side thereof respectively forming spaced areas 20 and 22 therebetween which are narrow in width and will be further described. Said body portions will be formed of a fabric of rubber-like composition suitable for forming said endless track.

The inner portion 18 of said track member will be smooth. The outer or ground engaging surface of said track member will have transverse raised rib or cleat portions as indicated by the reference numerals 24, 26 and 28 respectively.

Holding said body portions of said track member in transverse spaced relation and reinforcing the same are transverse rod members 30 each being comprised as here shown of a superposed pair of said rods 30a and 30b respectively.

By conventional methods said rods will be positioned in a mold such as an injection mold into which will be introduced the material in liquid form to make up the track structure in connection with said rod members.

Said rod members extend through said spaced areas 20 and 22 at such intervals longitudinally of said track member as to form sprocket teeth apertures 32 therebetween.

Carried by said rod members in said spaced areas 20 and 22 and extending between the central body portion 12 and the respective side body portions 14 and 16 are driving lug members 35. Said driving lug members as hereinafter described comprise the essential subject matter of the invention herein.

Driving lugs are required in a snowmobile endless track member for engagement by sprocket teeth to move the vehicle. Snowmobile endless track members generally have transverse reinforcing rods of some kind with portions thereof defining or separating sprocket tooth apertures and clamped about said portions of said rods are metal ring like members to provide a wear surface. Said ring like members are generally merely clamped about said portions of said rods and the rigidity of the metal is relied upon to retain said members in operating position. The ends of said ring like members with said members in position cannot be welded together without injuring or destroying adjacent portions of the track member.

The invention herein provides improvement in the structure of said driving lug members.

In molding the endless track member of the disclosure herein, as above described, the transverse rods are positioned in a mold to be embedded in the rubber composition of the track member to have said rubber composition cured thereabout for adhesion or bonding thereto. The improvement herein consists of positioning in a mold about each of said rods within the spaced areas 20 and 22, above indicated, a seamless metal band or ring like metal member forming said driving lug member 35. Said lug member is here shown to be oval in longitudinal section having shallow longitudinal concavities 35a and 35b at the upper and lower sides thereof.

With said lug member 35 positioned in a mold about said rods, as indicated, the rubber composition material of the track member in liquid form will be injected into the mold to fill the area about said rods within each of said members 35 to be cured therein for adhesion or bonding to said rods and to the inner surface of said members 35 to make an integral unitary structure whereby said members 35 and said rods 30 will be mutually bonded to the rubber composition material therebetween. Thus said lug members 35 have anchored therein a very effective internal insulating body which absorbs the effect of the stress resulting from the engagement of sprocket teeth with said lug members.

Said members 35 may also be initially positioned about said transverse rods and placed in a temporary mold to have said rubber composition disposed therein and partially cured. Said transverse rods and said lug members 31 may thereafter be placed in the regular track mold in which the entire track is formed and the rubber material disposed in said members 35 is then fully cured. This may result in better adhesion than by initially placing said lug members 35 about said rods within the track mold.

In operation in a conventional structure as above indicated, with wear clips or driving lugs being clamped in position, the clips are free of unitary engagement with the transverse rods. Said lugs are generally formed of a strip of metal material clamped about said rods with an appropriate device. The clips are subjected to considerable pounding by the engagement of sprocket teeth with the result that the wear clips become deformed and loosened about said rods.

The improvement herein as described consists of providing a seamless ring member positioned about the transverse rods of the track member and having bonded thereto the rubber composition material of which the track member is formed. Thus the lug members are integral and unitary with the transverse rods and the rubber composition material therebetween. There is no independent or relative movement of the lug member with respect to its internal cushion of rubber composition material. In being unitary with the rubber material there results very little deformation of the lug member and said lug member provides long lasting service. In maintaining its form said lug member preserves regular spacing between the sprocket tooth apertures for precise and regular engagement of said lug members by the sprocket teeth. The specific area of novelty in the structure herein is present in being bonded to a cushion body therein and in turn having this cushion body bonded to the transverse rod portion therein. This structure represents substantial improvement in snowmobile track construction.

It will of course be understood that various changes may be made in form, details arrangement and proportions of the parts without departing from the scope of the invention herein which, generally stated, consists in an apparatus capable of carrying out the objects above set forth, in the parts and combinations of parts disclosed and defined in the appended claims.

What is claimed is:
1. An endless track member as for a snowmobile comprising a belt of rubber composition material arranged to pass over sprocket wheels and be driven thereby having in combination,
   a central body portion,
   a side body portion at either side of said central body portion and spaced therefrom,
   rods disposed transversely through said track member spaced longitudinally thereof connecting said central body portion and said side portions holding the same in spaced relation and forming spaced areas therebetween,
   said rods in spaced relation forming sprocket tooth apertures therebetween within said spaced areas,
   a seamless ring like member disposed about each portion of said rods within said spaced areas,
   rubber composition material disposed within each of said ring like members and about each respective rod portion therein, and
   said rubber composition material being bonded to each of said ring like members and to said rod portion therein forming a unitary integral driving lug structure.

2. The structure set forth in claim 1 having in combination,
   an endless body portion of rubber composition material,
   rods disposed transversely through said track member spaced longitudinally thereof,
   longitudinally aligned apertures in said track member inwardly of either side thereof forming sprocket tooth apertures between adjacent of said rod members,
   a seamless ring like member disposed about each of said rod portions having said sprocket tooth apertures spaced therebetween,
   rubber composition material disposed within each of said ring like members and about the respective rod portions therein, and
   said rubber composition material being bonded to said ring like members and said rod portion therein to form a unitary integral driving lug structure.

* * * * *